United States Patent
Corbett, Jr.

(10) Patent No.: US 6,676,886 B2
(45) Date of Patent: Jan. 13, 2004

(54) PIPE BELLING PROCESS

(75) Inventor: Bradford Corbett, Jr., Fort Worth, TX (US)

(73) Assignee: S&B Technical Products, Inc., Fort Worth, TX (US)

( * ) Notice: Subject to any disclaimer, the term of this patent is extended or adjusted under 35 U.S.C. 154(b) by 13 days.

(21) Appl. No.: 09/964,016

(22) Filed: Sep. 26, 2001

(65) Prior Publication Data

US 2003/0057602 A1 Mar. 27, 2003

(51) Int. Cl.[7] .......................... B29C 55/26; B29C 57/04
(52) U.S. Cl. ................... 264/571; 264/102; 264/209.5; 264/237; 264/249; 264/290.2; 264/275; 264/296; 264/322; 264/348
(58) Field of Search .............................. 264/510, 511, 264/512, 102, 249, 209.5, 516, 322, 296, 570, 571, 275, 237, 290.2, 348

(56) References Cited

U.S. PATENT DOCUMENTS

| | | | | |
|---|---|---|---|---|
| 4,030,872 A | * | 6/1977 | Parmann | 425/393 |
| 4,428,900 A | | 1/1984 | Riley et al. | 264/526 |
| 5,449,487 A | | 9/1995 | Jarvenkyla | 264/508 |
| 5,928,451 A | * | 7/1999 | Jahansson et al. | 156/242 |
| 5,948,332 A | * | 9/1999 | Prenger | 264/40.5 |
| 6,033,617 A | * | 3/2000 | Guzowski | 264/516 |

* cited by examiner

Primary Examiner—Stefan Staicovici
(74) Attorney, Agent, or Firm—Charles D. Gunter, Jr.

(57) ABSTRACT

An improved pipe belling process is shown which features a mandrel having a specially designed backup or forming collar. The backup collar has an exposed lip portion which forms a complimentary angle with the outer sloped surface of the gasket which it abuts. The complimentary angles of the backup collar and gasket form a wedge shaped contact area which serves to retain the gasket in its initial circumferential position on the working surface of the mandrel as the heated pipe is forced over the mandrel and gasket.

10 Claims, 4 Drawing Sheets

PIPE BELLING PROCESS

BACKGROUND OF THE INVENTION

1. Field of the Invention

The present invention relates generally to sealing systems for thermoplastic pipes and, specifically, to an improved belling process for installing a gasket in a socket end of a thermoplastic pipe, particularly a pipe of oriented thermoplastic material.

2. Description of the Prior Art

Pipes formed from thermoplastic materials including polyethylene and PVC are used in a variety of industries. In forming a joint between sections of pipe, the spigot or male pipe end is inserted within the female or socket pipe end. An annular, elastomeric ring or gasket is typically seated within a groove formed in the socket end of the thermoplastic pipe. As the spigot is inserted within the socket, the gasket provides the major seal capacity for the joint. It is critical, during the installation process, that the gasket not be able to twist or flip since a displaced or dislocated gasket will adversely affect the ultimate sealing capacity of the joint.

In the early 1970's, a new technology was developed by Rieber & Son of Bergen, Norway, referred to in the industry as the "Rieber Joint." The Rieber system employed a combined mould element and sealing ring for sealing a joint between the socket end and spigot end of two cooperating pipes formed from thermoplastic materials. In the Rieber process, the elastomeric gasket was inserted within an internal groove in the socket end of the female pipe as the female or belling end was simultaneously being formed. The provision of a prestressed and anchored elastomeric gasket during the belling process at the pipe factory provided an improved socket end for a pipe joint with a sealing gasket which would not twist or flip or otherwise allow impurities to enter the sealing zones of the joint. These features increased the reliability of the joint and decreased the risk of leaks or possible failure due to abrasion or other factors. The Rieber process is described in the following issued U.S. Pat. Nos.:4,120,521; 4,061,459; 4,030,872; 3,965,715; 3,929,958; 3,887,992; 3,884,612; and 3,776,682.

In the Rieber process, the gasket is installed upon the working surface of a mandrel and abuts a backup collar which helps to position and retain the gasket during the subsequent belling operation. It is critical that the gasket not ride over the backup collar during the belling process. While the traditional backup collar functioned adequately for traditional thermoplastic pipe materials, more recently so called "molecularly oriented" thermoplastic materials have been utilized for the thermoplastic pipe.

The molecularly oriented thermoplastic materials enhance the strength of the article in certain directions by orienting the molecules in the plastic material in such direction, whereby the tensile strength of the plastic increases and the stretch decreases in such direction. Applied to tubular articles, orienting is effected in the radial direction, for instance to increase the pressure resistance of the pipe, or in the longitudinal direction of the pipe, for instance to increase the tensile strength of the pipe, or in both directions (biaxial orientation).

U.S. Pat. No. 4,428,900, shows a pipe of oriented thermoplastic polymeric material having an integral socket which is manufactured by expanding a tubular blank. The tubular blank is heated by circulation of hot water to a temperature at which deformation will induce orientation of the polymer molecules. The blank is then expanded radially outward against a mould by application of internal pressure. The finished pipe has an oriented structure capable of withstanding a greater hoop stress for a given wall thickness as compared to a pipe made of the same material that has not been oriented.

U.S. Pat. No. 5,449,487, shows an apparatus and method for orienting plastic pipe. A heated pipe is oriented radially by means of a conically widening mandrel which is located downstream of the plastic extruder.

As discussed, molecularly oriented pipe generally has greater tensile strength than traditional thermoplastic materials of the type used in the Rieber process. In practice, the use of molecularly oriented pipe in a standard Rieber forming mandrel/backup collar arrangement has resulted in the heated pipe displacing the gasket over the backup collar upon contact with the strengthened pipe material. As a result, the manufacturing process is interrupted at this point.

Despite the advances offered by the improved Rieber process, a need continues to exist for improving the process, particularly where molecularly oriented thermoplastic pipe is utilized in the belling operation.

Accordingly, one object of the present invention is to provide a method of installing a gasket in a socket end of a thermoplastic pipe in a Rieber-type process which features an improved backup collar which more securely retains the gasket in position during installation.

SUMMARY OF THE INVENTION

Another object of the present invention is to provide a method of installing a gasket in a socket end of a thermoplastic pipe in a Rieber-type process in which a molecularly oriented plastic material can be used to form the pipe without displacing the sealing gasket.

A method is shown for installing a gasket in a socket end of a thermoplastic pipe which is used to form a pipe joint or coupling. A mandrel is provided with an inner end and an outer end and having a generally cylindrical outer working surface. A gasket is installed at a first circumferential position on the outer working surface of the mandrel. A backup collar is provided at a second circumferential location on the mandrel, the backup collar having an exposed lip portion which abuts the gasket at an acute angle with respect to the outer working surface of the mandrel. The socket end of the thermoplastic pipe is heated and forced over the working surface of the mandrel and over the gasket and backup collar, whereby the heated socket end of the thermoplastic pipe flows over the gasket to form a retention groove for retaining the gasket. The backup collar is then retracted and the socket end of the pipe is cooled. The socket end of the pipe with its retained gasket can then be retracted from the working surface of the mandrel.

Preferably, the gasket is an elastomeric, ring shaped member having a circumferential contact area and an exterior surface, the exterior surface forming a sloped contact area for contacting the lip portion of the backup collar in complimentary, acute angle fashion. In the preferred embodiment, the complimentary acute angles of the backup collar and gasket form a wedge shaped contact area which serves to retain the gasket in its initial circumferential position on the working surface of the mandrel as the heated pipe is forced over the mandrel and gasket.

Although the traditional polyolefin/polyethylene pipe can be used in the method of the invention, the method also allows the use of molecularly oriented pipe. In molecularly oriented pipe manufacture, the pipe is heated, prior to contacting the gasket, to temperature at which deformation of the thermoplastic polymeric material of the pipe will cause orientation of polymer molecules of the pipe. Most preferably, the pipe is oriented biaxially by the heating which occurs prior to contacting the gasket.

Additional objects, features and advantages will be apparent in the written description which follows.

DETAILED DESCRIPTION OF THE INVENTION

Figure 1:
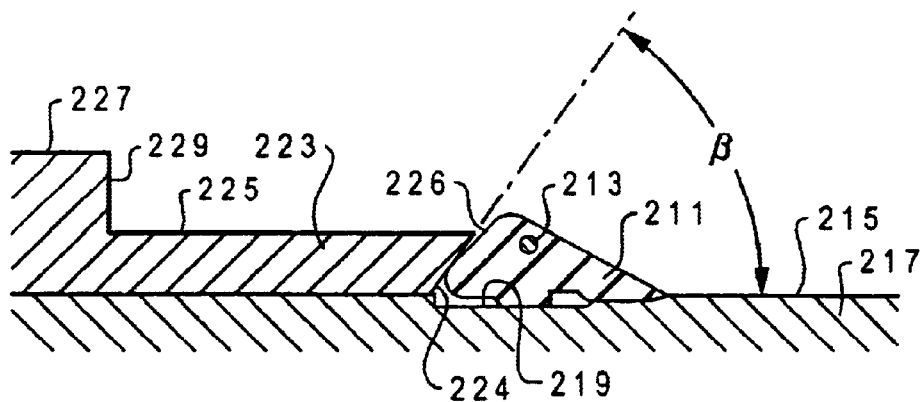
FIG. 1 is a side, partial cross-sectional view of the improved mandrel and backup collar used in the belling process of the invention.
Figure 5:
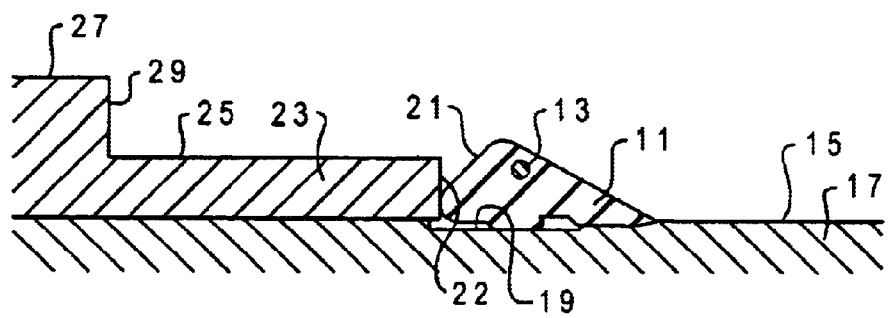
FIGS. 5–8 are simplified, schematic views of the prior art Rieber process for installing a gasket in a socket end of a thermoplastic pipe, showing the prior art mandrel and backup collar.
Figure 6:
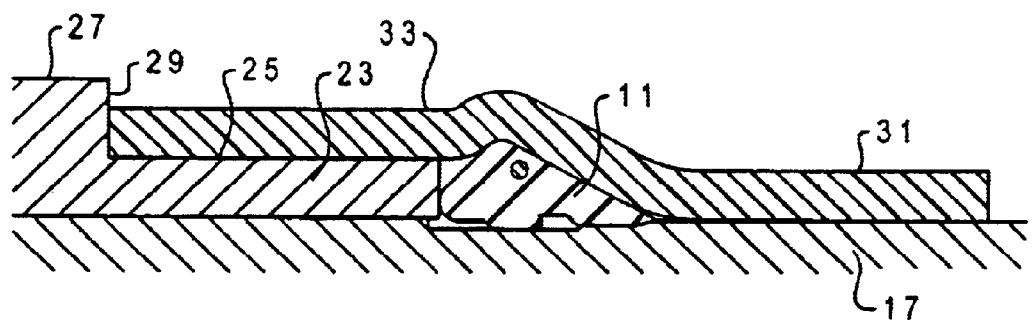
Figure 7:
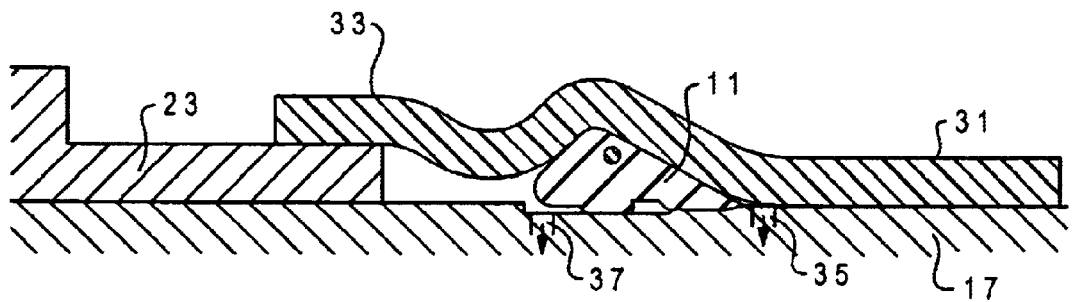
Figure 8:
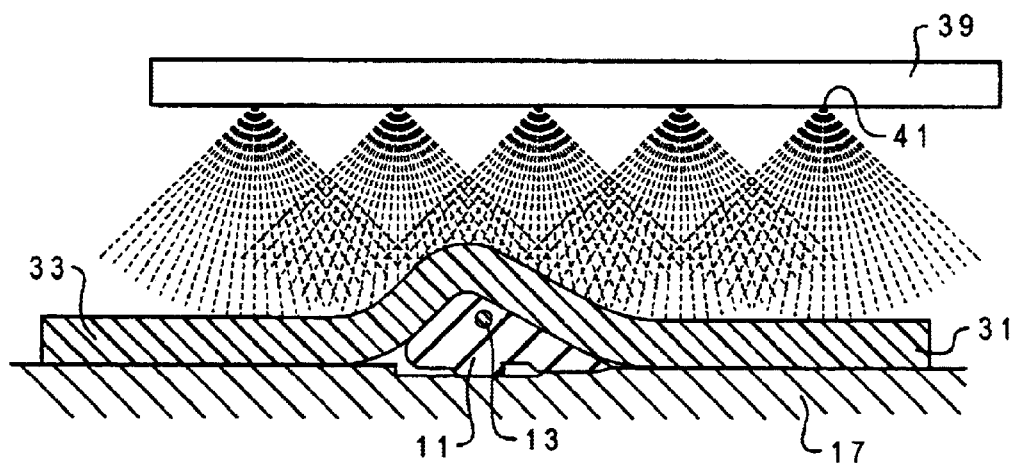

The advantages of the method of the invention can best be understood with reference to a simplified discussion of the prior art Rieber process. Turning first to FIGS. 5–8, the prior art process is illustrated. FIG. 5 shows a section of a conventional elastomeric sealing gasket 11 having a steel reinforcing ring 13 in place on the generally cylindrical outer working surface 15 of the mandrel 17 used in the belling process. The elastomeric gasket 11 can be formed of, for example, rubber and is a ring shaped, circumferential member having an inner compression surface 19 and an exposed nose portion 21 which, as shown in FIG. 1, abuts a forming collar 23. The nose portion 21 forms a sloped contact area for contacting the lip portion 22 of the backup collar 23. The forming collar 23 has a first generally cylindrical extent 25 which is joined to a second cylindrical extent 27 by a step region 29, whereby the second extent 27 is of greater external diameter than the first cylindrical extent 25, shown in FIG. 10. The lip portion 22 of the backup collar 23 forms a right angle with respect to the working surface 15 of the mandrel 17.

In the first step of the prior art process, the steel reinforced elastomeric ring 11 is thus placed onto the working surface of the mandrel 17 and pushed to a position against the back-up or forming collar 23. In this position, the gasket is anchored to the mandrel surface with the rubber between the mandrel and the steel ring of the gasket being compressed by approximately 20%

In the second step of the prior art process, the socket end 33 of the thermoplastic pipe 31 (FIG. 6) is heated and pushed over the steel mandrel 17, gasket 11 and back-up collar 23. The socket end 33 is expanded due to the thermoplastic nature of the pipe. A number of thermoplastic materials, such as polyethylene, polypropylene and polyvinylchloride (PVC) are known in the prior art having the required expansion characteristics, depending upon the end application of the pipe joint. The socket end 33 flows over the first cylindrical extent 25 of the back-up collar 23 and abuts the step region 29 in the second step of the process.

In the next step of the prior art process (FIG. 7) the mandrel and pipe move away from the back-up collar 23 and the pipe socket end 33 retracts around the mandrel and gasket 11 due to the elastic forces of the thermoplastic material. Typically, vacuum was also applied through ports 35, 37 which connected the mandrel working surface with a vacuum source (not shown).

In the final step of the prior art process (FIG. 8), the pipe socket end 33 is cooled by means of a water spray bar 39 and spray nozzles 41. As the cooling takes place, the pipe socket end 33 shrinks around the gasket 11, thus compressing the rubber body of the gasket between the steel reinforcing ring 13 and the socket-groove to establish a firm seal.

The above described Rieber process has been in commercial use since the early 1970's and is described in the above referenced issued United States patents, among other sources. It will thus be well familiar to those skilled in the thermoplastic pipe sealing arts.

Although the apparatus and method of the invention can be used with traditional polyolefin pipe, the apparatus also offers additional advantages for use with molecularly oriented pipe. The apparatus and method of the invention in the most preferred form, are thus directed toward a Rieber type process of the type described above in which the thermoplastic pipe which is heated and supplied to the working surface of the mandrel is a "molecularly oriented" thermoplastic material. A variety of techniques are known in the art at this time for providing such oriented materials. The materials may be oriented longitudinally, radially, or in both directions (biaxially). Typically, the orienting station will comprise a portion of the extruder which feeds heated thermoplastic pipe to the working surface of the mandrel, or will be a station located immediately downstream of the of the extruder.

Figure 9:
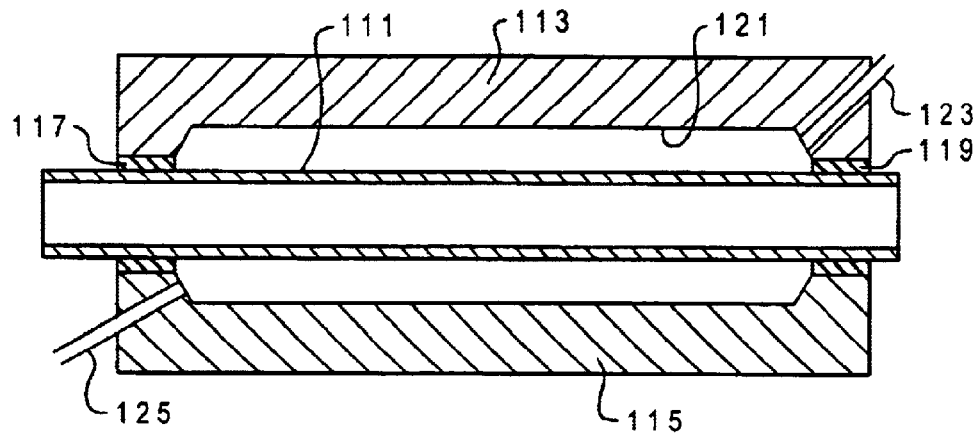
FIG. 9 is a side, cross-sectional view of a prior art process for producing longitudinally oriented thermoplastic pipe.

FIG. 9 shows one prior art technique for producing plastic pipe of oriented thermoplastic polymeric material. In this technique, a tubular blank 111 of PVC having a Vicat softening point of 82° C. is located in a split female mould having an upper portion 113 and a lower portion 115. The blank is sealed into the mould by means of seal regions 117, 119 so that an annular chamber 121 is defined between the outer surface of the blank 111 and the inwardly facing surfaces of the two mould halves 113, 115. The annular chamber 121 can be filled with hot water through an inlet pipe 123 and can be drained by an outlet pipe 125.

After the mould halves 113, 115 have been clamped together so that the seals 119, 125 engage the blank 111, hot water at a temperature of approximately 92° C. is passed through the inlet pipe 123 into the annular chamber 121 and is recirculated through the outlet pipe 125 past a water heater back to the inlet pipe 123 for a sufficient time to heat the blank 111 to a temperature in the range from about 82° C. to 92° C. In this way, the material of the tubular blank 111 is oriented to produce a corresponding increase the hoop strength of the finished pipe. After the blank 111 has been fully expanded in the mould, the resultant pipe can be cooled in any convenient manner, for example by cooling the mould haves 113, 115 with cold water or by passing cold water through the bore of the pipe at an appropriate pressure to retain the pipe shape until the temperature has dropped below the point at which reversion would occur.

Figure 10:
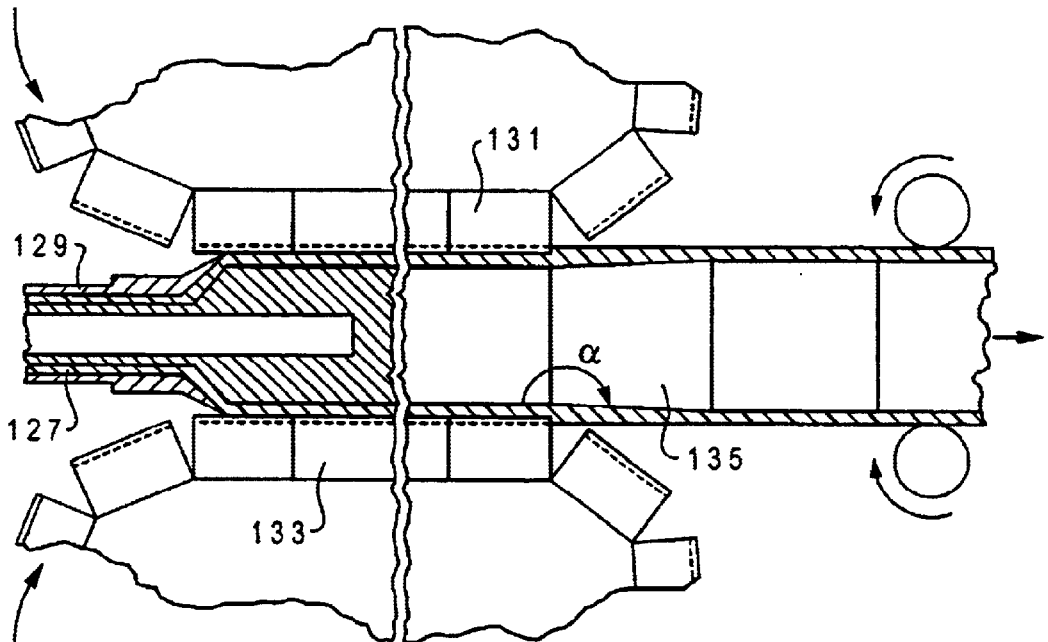
FIG. 10 is a side, cross-sectional view of a prior art process for producing radially oriented thermoplastic pipe.

FIG. 10 shows another prior art technique in which a thermoplastic pipe is oriented after exiting the plastic extruder. In this case, the pipe blank 127 produced from the extruder 129 is fed into a pipe forming apparatus which is provided with movable members 131, 133. The members 131, 133 are movable in an endless-chain fashion in the direction of the arrows. The moving members 131, 133 thus convey the pipe in the forward direction illustrated by the arrow in FIG. 10.

As the plastic pipe slides along the mandrel 135 it is conically widened by the conical shape of the mandrel. In this way, the plastic pipe is oriented radially while the pipe is still soft after the initial forming. The diameter of the widening mandrel 135 is, for example, about 1.1 to 1.5 times the diameter of the pipe produced from the extruder. The conical angle "α" in FIG. 10 and the length of the conical portion can vary in accordance with the conditions and desired final result. Also, axial orientation in the molecular structure of the pipe is also possible to produce simultaneously if the pipe is drawn at a higher speed than that in which it issues from the extruder and drive elements 131, 133. In that case, the pipe will be oriented "biaxially", which provides advantages in strength and durability for the pipe.

With reference to FIGS. 1–4, the improved method of installing a gasket in a socket end of a thermoplastic pipe is illustrated. As with respect to the described Rieber process illustrated in FIGS. 5–8, a mandrel 217 is provided with an outer working surface 215. A gasket 211 is installed at a first circumferential position within a groove 219 provided in the working surface. A backup collar is provided at a second circumferential location on the mandrel 217. The backup collar 223 has an exposed lip portion 224 which abuts the gasket sloped contact area 226. As shown in FIG. 1, the exposed lip portion 224 of the backup collar 223 forms an acute angle "β" with respect to the outer working surface 215 of the mandrel 217. The angle β will be less than 90° and is preferably within the range from about 30 to 70°.

Figure 2:
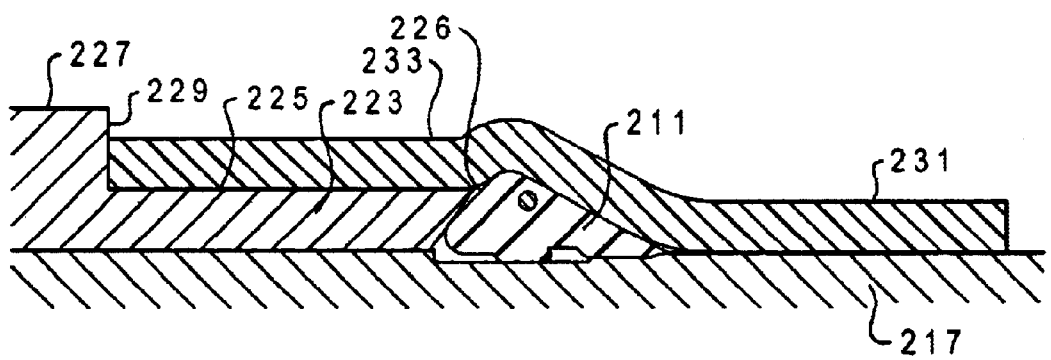
FIGS. 2–4 are simplified, schematic views of the method steps used in the method of installing a gasket of the invention.

As seen in FIGS. 1–4, the gasket 211 is an elastomeric, ring shaped member having a circumferential contact area with the mandrel and an exterior surface. A portion of the exterior surface forms the sloped contact area 226 for contacting the lip portion 224 of the backup collar 223 in complimentary fashion. Preferably, the sloped contact area 226 of the gasket exterior surface also forms an acute angle with respect to the working surface of the mandrel of the 217. As best seen in FIGS. 1 and 2, the complimentary acute angles of the backup collar 223 and gasket 211 form a wedge shaped area which serves to retain the gasket in its circumferential position on the working surface of the mandrel as the heated pipe 231 is forced over the mandrel and gasket.

While the improved mandrel and backup collar illustrated can be utilized with any type thermoplastic pipe normally used in a Rieber process, the apparatus has particular applicability to the use of the previously described molecularly oriented thermoplastic materials. FIG. 2 assumes that the socket end 229 of the plastic pipe 231 is a pipe exiting an orienting station such as the station described with respect to FIG. 10 of the prior art. FIG. 2 shows the heated socket end 229 of the pipe being forced over the working of the mandrel and over the gasket and backup collar, whereby the heated socket end flows over the gasket to form a retention groove for retaining the gasket.

Figure 3:
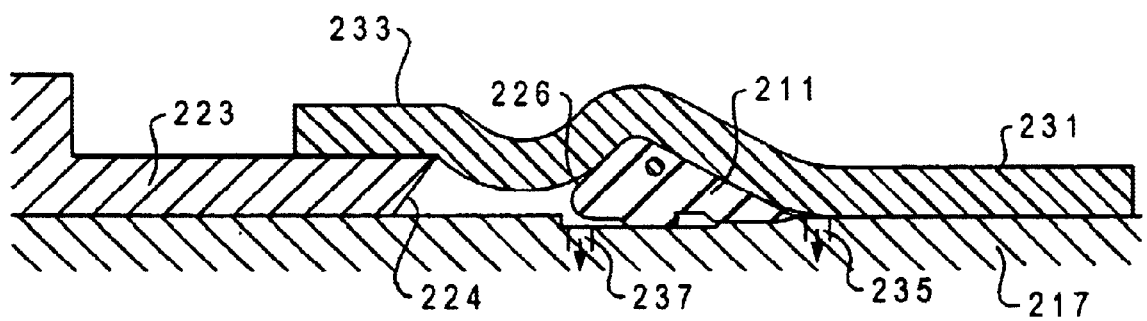
Figure 4:
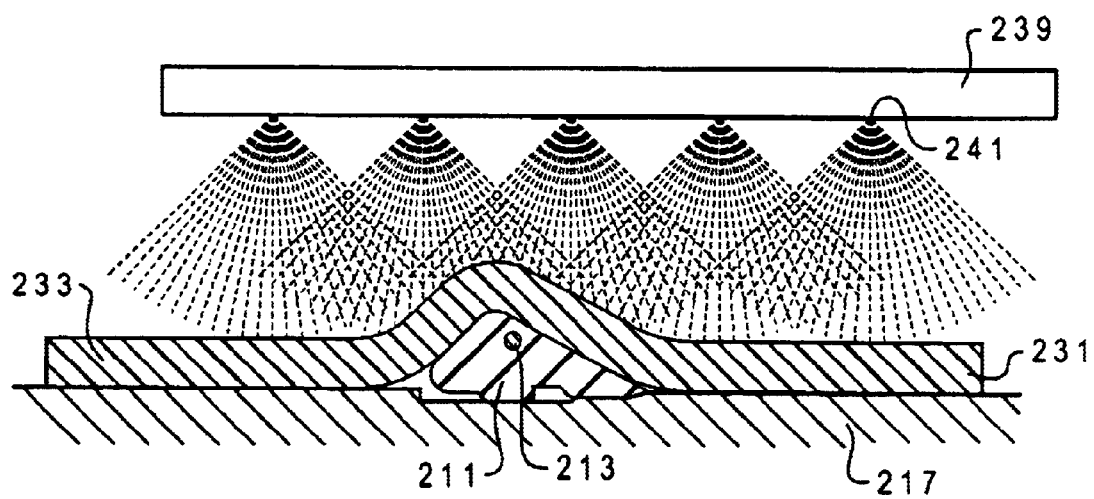

FIG. 3 illustrates the initial step of retracting the mandrel from the backup collar so that the socket end of the pipe is allowed to retract about the working surface 215 of the mandrel. FIG. 4 illustrates a cooling step in which the retracted socket end is cooled, thereby allowing the mandrel to be retracted from the pipe end with the gasket 211 being retained within the formed groove.

An invention has been provided with several advantages. The Rieber process itself provides an improved socket end for a pipe joint in which the sealing gasket is pre-stressed and anchored in position during the belling process at the pipe factory. The pre-stressed and anchored gasket which is installed integrally during the manufacturing process resists any tendency to twist or flip during field installation and resists the tendencies for impurities to enter the sealing zones of the joint. The improved apparatus of the invention more securely positions the sealing gasket during the installation process where traditional polyolefin pipe is utilized in the process. The improved apparatus and method of the invention further adapts the Rieber process for use with "oriented" thermoplastic pipe, including biaxially oriented pipe. These oriented materials have improved strength and durability allowing pipe to be formed with thinner wall thickness which achieves adequate strength and performance characteristics. The apparatus of the invention is simple in design and economical to manufacture and can be easily adapted to existing equipment.

While the invention has been shown in only one of its forms, it is not thus limited but is susceptible to various changes and modifications without departing from the spirit thereof.

What is claimed is:

1. A method of installing a gasket in a socket end of a molecularly oriented thermoplastic pipe which is used to form a pipe coupling, the method comprising the steps of:

providing a mandrel with an inner end and an outer end and having an outer working surface;

installing a gasket at a first circumferential position on the outer working surface;

providing a backup collar at a second circumferential location on the mandrel, the backup collar having an exposed lip portion which abuts the gasket at an acute angle with respect to the outer working surface of the mandrel;

heating a socket end of the thermoplastic pipe;

forcing the heated socket end of the thermoplastic pipe over the working surface of the mandrel and over the gasket and backup collar, whereby the heated socket end of the thermoplastic pipe flows over the gasket to form a retention groove for retaining the gasket;

retracting the backup collar;

cooling the heated socket end of the thermoplastic pipe;

retracting the cooled socket end of the thermoplastic pipe and the retained gasket from the working surface of the mandrel;

wherein the gasket is an elastomeric, ring shaped member having a circumferential contact area and an exterior surface, the exterior surface forming a sloped contact area for contacting the lip portion of the backup collar in complimentary fashion;

wherein the sloped contact area of the gasket exterior surface also forms an acute angle with respect to the working surface of the mandrel;

wherein the complimentary acute angles of the backup collar and gasket form a wedge shaped contact area which serves to retain the gasket in its initial circumferential position on the working surface of the mandrel as the heated pipe is forced over the mandrel and gasket; the wedge shaped contact area exerting both a longitudinal restraining force along the pipe longitudinal axis and a radial restraining force which is perpendicular to the pipe longitudinal axis to force the gasket radially inward in the direction of the mandrel as the pipe is pushed over the mandrel.

2. The method of claim 1, where in the pipe is heated, prior to contacting the gasket, to temperature at which deformation of the thermoplastic polymeric material of the pipe will cause orientation of polymer molecules of the pipe.

3. The method of claim 2, wherein the pipe is oriented biaxially by the heating which occurs prior to contacting the gasket.

4. A method of installing a gasket in a socket end of a molecularly oriented thermoplastic pipe which is used to form a pipe coupling, the method comprising the steps of:

provm a mandrel with an inner end and an outer end and having at least a portion of a length thereof which forms a generally cylindrical outer working surface;

installing a gasket at a first circumferential position on the outer working surface;

providing a backup collar at a second circumferential location on the mandrel nearer the inner end of the mandrel, the backup collar having an exposed lip portion which abuts the gasket at a smoothly sloping acute angle with respect to the outer working surface of the mandrel when in a normally extended position, the backup collar being extendable and retractable along a longitudinal axis parallel to a longitudinal axis of the mandrel;

heating a socket end of the thermoplastic pipe;

forcing the heated socket end of the thermoplastic pipe over the working surface of the mandrel and over the gasket with backup collar in the extended position, whereby the heated socket end of the thermoplastic pipe flows over the gasket to form a retention groove for retaining the gasket;

retracting the backup collar;

cooling the heated socket end of the thermoplastic pipe;

retracting the cooled socket end of the thermoplastic pipe and the retained gasket from the working surface of the mandrel;

wherein the gasket is an elastomeric, ring shaped member having a circumferential contact area and an exterior surface, the exterior surface forming a sloped contact area for contacting the lip portion of the backup collar in complimentary fashion;

wherein the sloped contact area of the gasket exterior surface also forms an acute angle with respect to the working surface of the mandrel;

wherein the complimentary acute angles of the backup collar and gasket form a wedge shaped contact area which serves to retain the gasket in its initial circumferential position on the working surface of the mandrel as the heated pipe is forced over the mandrel and gasket; the wedge shaped contact area exerting both a longitudinal restraining force along the pipe longitudinal axis and a radial restraining force which is perpendicular to the pipe longitudinal axis to force the gasket radially inward in the direction of the mandrel as the pipe is pushed over the mandrel.

5. The method of claim 4, wherein the pipe is heated, prior to contacting the gasket, to temperature at which deformation of the thermoplastic polymeric material of the pipe will cause orientation of polymer molecules of the pipe.

6. The method of claim 5, wherein the pipe is oriented biaxially by the heating which occurs prior to contacting the gasket.

7. The method of claim 6, further comprising the step of:

applying a vacuum to the heated, socket end of the thermoplastic pipe after the pipe has been forced over the working surface of the gasket and mandrel to thereby force the heated, socket end to contract about the mandrel and gasket.

8. The method of claim 7, wherein the heated thermoplastic pipe is cooled by a water spray after the mandrel is retracted.

9. The method of claim 8, wherein the thermoplastic pipe is heated by a water bath in the temperature range from about 82 to 92° C. prior to contacting the gasket.

10. The method of claim 8, in which the pipe is expanded radially while in the temperature range from about 82 to 92° C. by forcing the pipe over an tapered mandrel prior to contacting the gasket.

* * * * *